SERVOMECHANISM PROVIDING STATIC LOAD ERROR WASHOUT

Original Filed Nov. 20, 1963 5 Sheets-Sheet 1

INVENTORS
William J. Thayer
Kenneth D. Garnjost
BY Popp and Sommer
ATTORNEYS

SERVOMECHANISM PROVIDING STATIC LOAD ERROR WASHOUT

INVENTORS
William J. Thayer
Kenneth D. Garnjost
BY
Popp and Sommer
ATTORNEYS

Sept. 2, 1969 W. J. THAYER ET AL 3,464,318

SERVOMECHANISM PROVIDING STATIC LOAD ERROR WASHOUT

Original Filed Nov. 20, 1963 5 Sheets-Sheet 3

INVENTORS
William J. Thayer
Kenneth D. Garnjost
BY
Popp and Sommer
ATTORNEYS

SERVOMECHANISM PROVIDING STATIC LOAD ERROR WASHOUT

Original Filed Nov. 20, 1963 5 Sheets-Sheet 4

INVENTORS
William J. Thayer
Kenneth D. Garnjost
BY Popp and Sommer
ATTORNEYS

SERVOMECHANISM PROVIDING STATIC LOAD ERROR WASHOUT

Original Filed Nov. 20, 1963 5 Sheets-Sheet 5

INVENTORS
William J. Thayer
Kenneth D. Garnjost
BY Popp and Sommer
ATTORNEYS

United States Patent Office 3,464,318
Patented Sept. 2, 1969

3,464,318

SERVOMECHANISM PROVIDING STATIC LOAD ERROR WASHOUT

William J. Thayer, East Aurora, and Kenneth D. Garnjost, Buffalo, N.Y., assignors to Moog Inc., a corporation of New York Continuation of application Ser. No. 324,976, Nov. 20, 1963. This application June 3, 1966, Ser. No. 555,205
Int. Cl. F15b *13/16, 9/09, 9/06*
U.S. Cl. 91—359 39 Claims

ABSTRACT OF THE DISCLOSURE

A construction of servomechanism is disclosed which makes adjustments not only for internal compliance but also external compliance of the supporting structure due to the static loading and therefore eliminates or washes out static load error.

This application is a continuation of application 324,976, now abandoned.

This invention relates to improvements in servomechanisms.

Frequently in a servo system which includes an actuator for positioning a load, a positional control problem is created by the mass or inertia of the load in conjunction with the compliance of the structure mounting the actuator or compliance of the fluid driving the actuator, the latter being particularly severe where a gas is the fluid. These compliant effects create a predominant resonant frequency for a load which may be underdamped. Such a situation may be encountered where a load is mounted on anti-friction bearings so that little friction is available for physical damping and there is high resonant amplitude. Examples include the swiveling of a thrust nozzle forming part of a liquid propellant rocket engine, the drive for radar antenna tracking or the drives in certain machine tools. In a typical rocket engine, this resonance may occur at frequencies between 7 and 15 c.p.s. and have an amplitude ratio as high as 20 db (equivalent damping ratio of 0.05). Quite obviously this load resonance presents a severe stability problem for the engine position control actuators.

Heretofore a number of servocontrol techniques have been employed to satisfy the requirements of accuracy and dynamic response and these have met with varying degrees of success. One technique for improving dynamic response or controllability of the servo system is to add negative load pressure feedback in the servo system, such as disclosed in Patent No. 2,964,059 for example. This pressure feedback contributes effective damping of load resonance and the damping can be set by adjusting the sensitivity of the flow-to-pressure effect. In a pressure-flow servovalve such as shown in said Patent No. 2,964,059, the load pressure feedback effect is proportional and therefore is present at all frequencies, including static load conditions on up through load resonant frequency. Thus, while such a pressure-flow servovalve has the desirable result at load resonant frequency of contributing damping, it has the undesirable effect statically of the actuator yielding or retrogressing proportional to the load it is seeking to apply. In other words, the actuator piston will move retrogressively until an error signal is developed in the position servoloop which acts through the servovalve to offset the pressure feedback force. This is an error in position that is related to the magnitude of the static load that the actuator is supposed to hold.

In order to overcome the deficiency of static stiffness in such a prior art pressure-flow servovalve, it has been proposed heretofore to employ a dynamic pressure feedback servovalve such as disclosed in Patent No. 3,095,906. Such a dynamic pressure feedback valve inserts a high pass frequency sensitive network in the load pressure feedback path such that the static load pressure feedback is washed out, but the dynamic pressure variations associated with the load resonance are passed. This eliminates displacement of the actuator piston due to load under static conditions, but there is still a significant error due to deflection of the structure mounting the actuator. The loss of accuracy due to actuator displacement under load is identical to the change of load member position permitted by compliance of the supporting structure. Unfortunately the only practical location for the system position feedback transducer is at the actuator, so the position error due to structural compliance acts entirely outside the position servoloop. The total loading error therefore represents the combination of the actuator and structural compliances acting in series. This total compliant effect acts between the desired load member position and the actual load member position. Typically the two effects of internal compliance and external compliance, the latter due to deflection of the mounting structure, are about equal. In other words, the dynamic pressure feedback servovalve such as shown in said Patent No. 3,095,906 eliminated about half the problem but such servovalve did not correct for deflection of the supporting structure.

It is accordingly one of the primary objects of the present invention to provide a servomechanism which completely eliminates position errors due to compliance of both the actuator and its supporting structure and is therefore capable of static load error washout.

Another object is to provide such a servomechanism which has inherent fail-safe tendencies.

Another object is to provide such a servomechanism which is simple in construction.

Other objects and advantages of the present invention will be apparent from the following detailed description of several embodiments thereof shown in the accompanying drawings in which.

Figure 1:
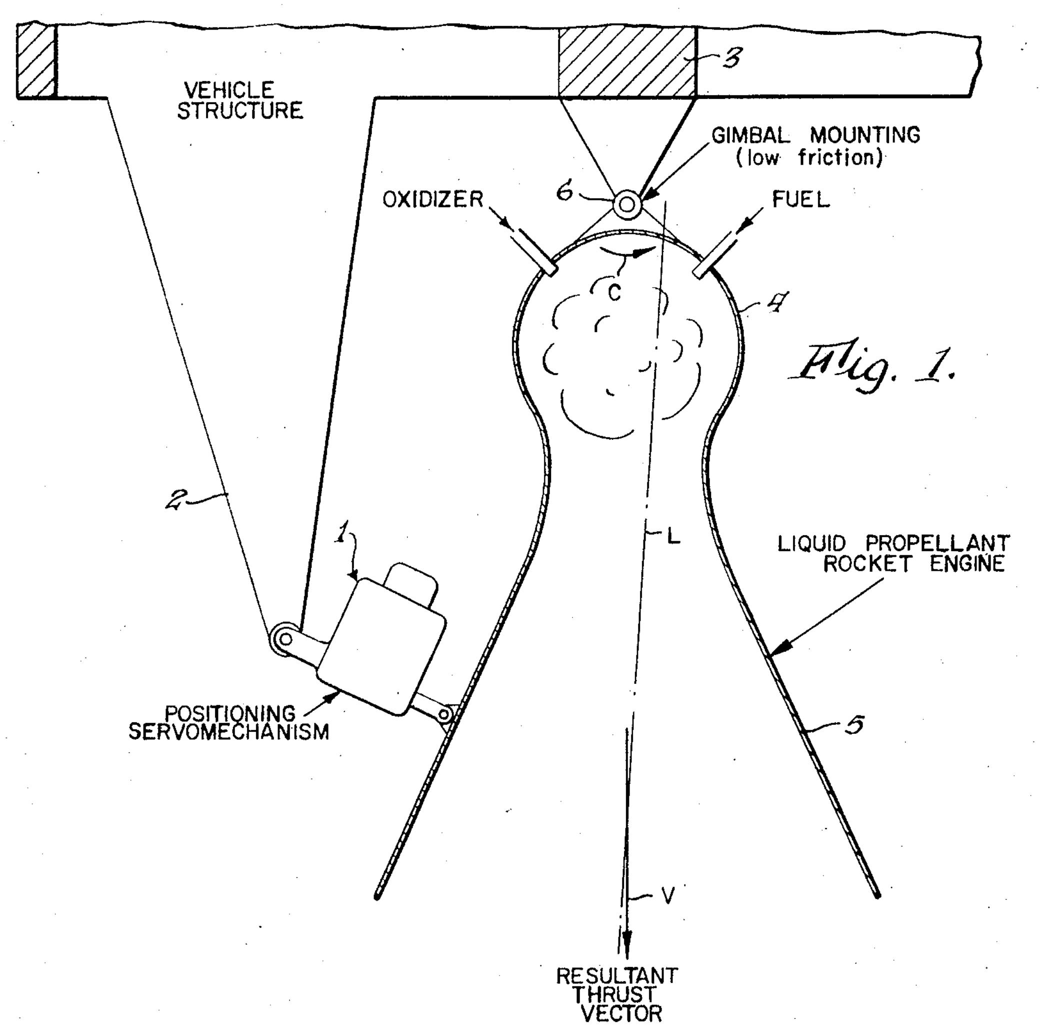
FIG. 1 is a schematic view showing a positioning servomechanism constructed in accordance with the principles of the present invention operatively interposed between a deflectable vehicle structure and the nozzle of a gimbaled rocket engine.

In order to illustrate the feature of static load error washout, reference is made to FIG. 1 which shows a positioning servomechanism 1 operatively interposed between a deflectable portion 2 of a vehicle structure 3 on which a liquid propellant rocket engine 4 is mounted having a thrust nozzle 5, such mounting being of the gimbal type indicated at 6. Normally the resultant thrust vector V acs through the center of the gimbal mounting 6 but if there is asymmerical combustion or asymmetrical geometry of the engine 4 with respect to the gimbal center 6, this may produce a resultant thrust vector acting along the line L which is laterally displaced with respect to the gimbal center thus producing a couple C which urges the engine 4 to rotate about the axis of the gimbal 6 in a counterclockwise direction in the illustrated example. Such a couple in the same or opposite direction can be otherwise generated as by acceleration effects or wind loads. Regardless of how caused, such a couple imposes a static load on the positioning servomechanism 1. Such static load can cause deflection of the portion 2 of the vehicle structure. It will thus be seen that a static load error can be created.

One of the primary purposes of the present invention is to provide a construction of servomechanism which will eliminate or washout such static load error, that is, the servomechanism will make adjustments not only for internal compliance but also external compliance of the supporting structure due to the static loading.

Figure 2:
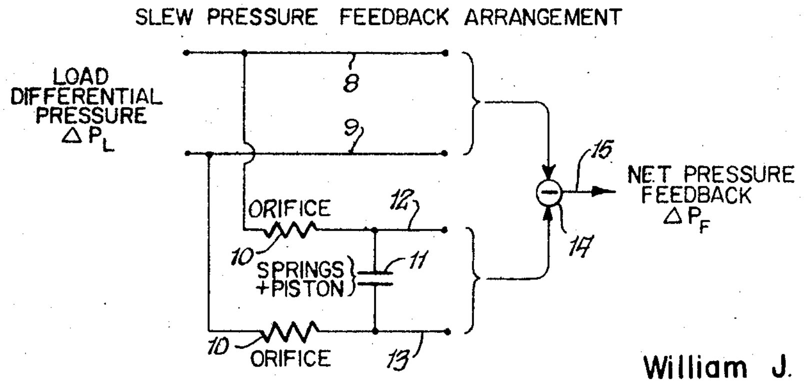
FIG. 2 is a diagram illustrating the basic concept of the present invention which provides static error load washout achieved by combining a proportional pressure feedback in parallel with a low pass pressure feedback having the opposite polarity.

The principle of the static load error washout concept is generically diagrammed in FIG. 2 where the lines 8 and 9 represent feedback conduits for transmitting the individual pressures on opposite sides of an actuator piston (not shown) connected to a load so that the difference between these pressures represents load differential pressure $\Delta P_L$. In parallel with these lines is shown a low pass frequency sensitive network including fluid restrictor means 10 and fluid accumulator means 11 to produce individual pressures in lines 12 and 13, the difference between these pressures representing a filtered feedback pressure differential. The differential pressure in lines 8 and 9 is combined at point 14 with the differential pressure in lines 12 and 13, but with reversed polarity, i.e., by interchanging the lines 12 and 13 in the summation, to provide a net pressure feedback effect $\Delta P_F$ or force represented by the arrow 15.

Potential failures of the arrangement shown in FIG. 2 are clogging of the fluid restrictor means 10 including one or more restricted orifices, or stoppage of the fluid accumulator means 11 which may be in the form of a spring-centered piston. In either event the inventive arrangement retains pressure feedback in lines 8, 9 for load stabilization while losing only the error washout capability normally provided by activation of lines 12, 13.

FIGS. 3–5

Figure 3:
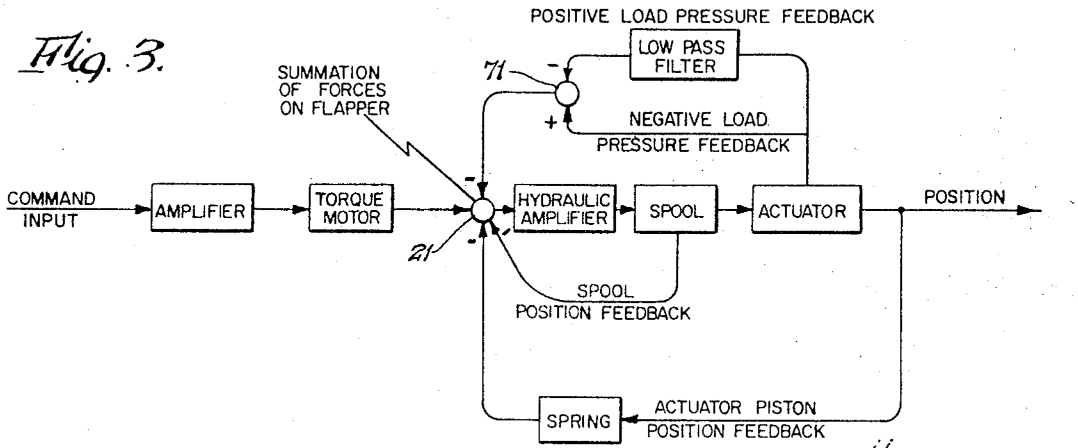
FIG. 3 is a block diagram of a positioning servomechanism embodying one form of the present invention.
Figures 4, 5:
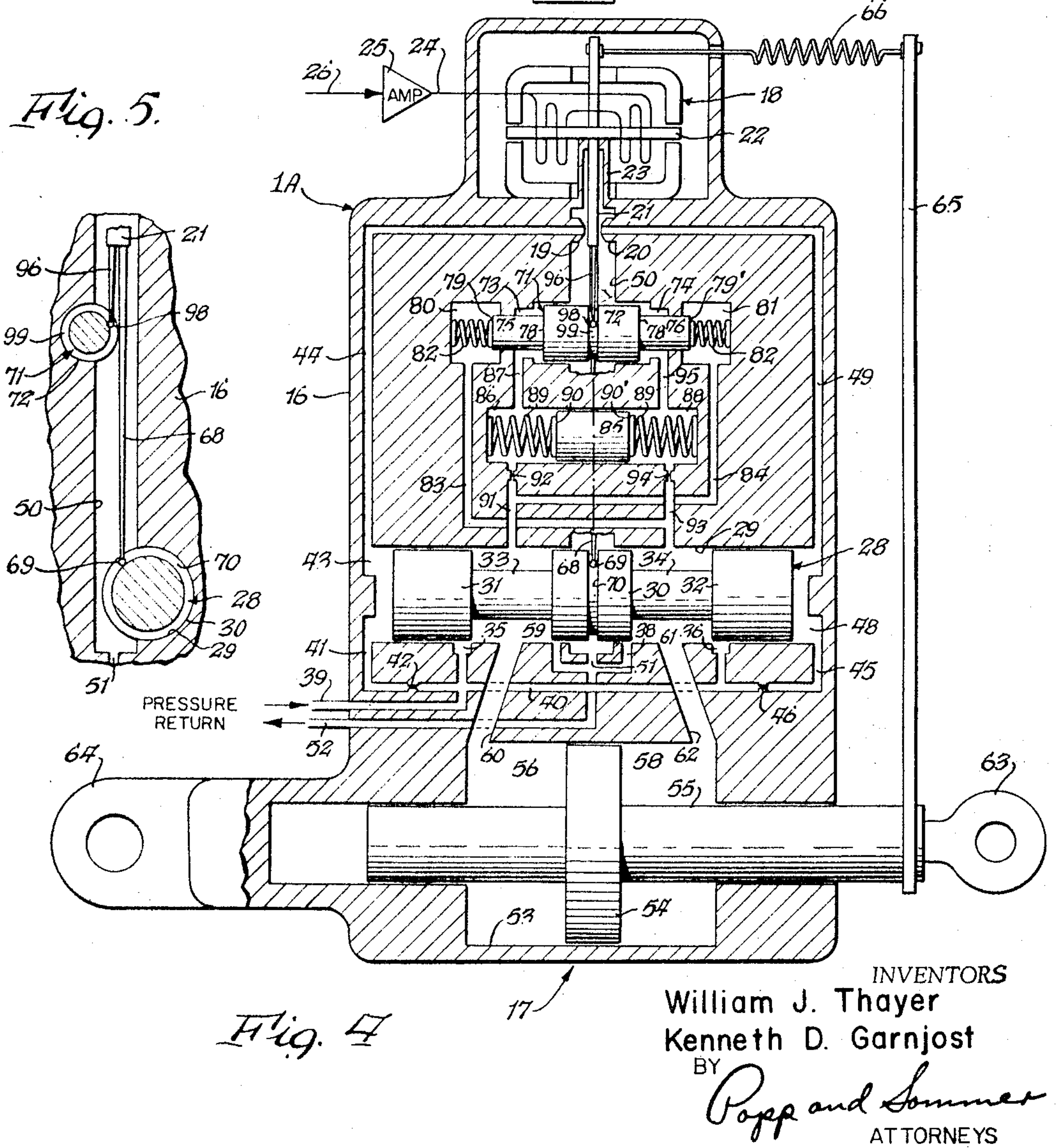
FIG. 4 is a diagrammatic central vertical longitudinal sectional view of a servomechanism constructed according to FIG. 3.
FIG. 5 is a fragmentary central vertical transverse sectional view of the servomechanism shown in FIG. 4.

The servomechanism 1A shown in FIG. 4 and block diagrammed in FIG. 3 is characterized by all feedback forces being summed on the flapper of the fluid amplifier input stage of the servomechanism, such feedback forces including spool position feedback, actuator piston position feedback, and the net of negative and positive load pressure feedbacks.

The servomechanism 1A is shown as comprising a two stage valve means which controls the flow of fluid for driving an actuator means. As shown, the valve means and actuator means are combined into a unitary assembly which diagrammatically is shown as including a body 16 suitably internally passaged and compartmented to provide fluid conducting communication between various parts of the servomechanism and also to house other components thereof, as hereinafter described.

The valve means include an input stage means having a torque motor 18 of known construction and a hydraulic amplifier means which is shown as including a pair of nozzles 19 and 20 between which a flapper 21 is movably arranged. This flapper is shown as a vertically arranged member connected intermediate its ends to a horizontal armature plate 22 of the torque motor. A flexure tube 23 preferably supports the armature-flapper member 22, 21 for pivotal movement with respect to the nozzles 19 and 20. The torque motor 18 is also shown as including a pair of coils which receive an electrical signal through a conductor 24 in which an amplifier 25 is arranged and into which a command input signal represented by the arrow 26 can be fed.

The output stage of the valve means is shown as comprising a movable valve member 28 slidably arranged in a main chamber 29 formed within the body 16. This valve member 28 is shown as being in the form of a spool including a center lobe 30 and axially spaced end lobes 31 and 32 connected respectively by spool stem portions 33 and 34 of reduced diameter. When the valve spool 28 is in its centered or null position as shown in FIG. 4 its end lobes close pressurized fluid supply ports 35 and 36 respectively and the center lobe 30 closes a return port 38.

Fluid under pressure is supplied through a supply conduit 39 which leads to the pressure port 35. A branch conduit 40 establishes fluid conducting communication between the other pressure port 36 and the supply conduit 39. From the supply conduit 39 another branch line 41 having a restrictor 42 therein is shown as leading to a left spool end chamber 43 at the end of the main chamber 29 adjacent the end lobe 31. From this spool end chamber 43 a conduit 44 leads to the left nozzle 19.

Another branch conduit 45 having a restrictor 46 therein is shown as establishing fluid conducting communication between the branch conduit 40 and a right spool end chamber 48 located adjacent the outer end of the end lobe 32. From this spool end chamber 48 a conduit 49 leads to the right nozzle 20.

The nozzles 19 and 20 discharge fluid into a sump chamber 50 which extends downwardly through the body 16 to adjacent the center lobe 30 of the valve spool where this chamber communicates with the return port 38 via a restricted orifice 51. The return port 38 is shown as communicating with a return conduit 52.

The actuator means indicated generally at 17 is shown as including a portion of the body 16 formed to provide a cylinder or compartment 53 in which an actuator piston 54 fixedly mounted on a piston rod 55 is slidably arranged. This arrangement forms chambers 56 and 58 on opposite sides of the piston 54. The left chamber 56 is shown as communicating with the annular space 59 surrounding the left spool stem portion 33 between the lobes 30 and 31, via a load conduit 60. Similarly the right actuator chamber 58 is shown as communicating with the annular space 61 surrounding the right spool stem portion 34 between the lobes 30 and 32, via a load conduit 62.

One end of the actuator piston rod 55 is shown as extending outwardly of the body 16 and formed at its extremity with an eye 63 to adapt it for connection to a part to be moved such as the engine nozzle 5 shown in FIG. 1. The body 16 of the servomechanism, on the side thereof opposite from the outwardly extended portion of the actuator piston rod 55, is shown as laterally extended and formed at its outer end with an eye 64 so as to adapt it for connection to supporting structure, such as the deflectable portion 2 of the vehicle structure shown in FIG. 1.

Mechanical force position feedback means are shown as operatively interposed between the actuator piston 54 and the armature-flapper member 22, 21 of the valve input stage. While this mechanical force position feedback means may be constructed in any suitable manner, it is illustrated more or less diagrammatically in FIG. 4 as including an arm 65 fixed at one end to the outer end of the actuator piston rod 55 and extending upwardly to a point adjacent the torque motor 18. The upper end of the position feedback arm 65 is shown as connected by a feedback spring 66 to the upper end of an upright extension of the armature-flapper members 21, 22.

Any other form of mechanical force position feedback means between the actuator and the input stage of the valve means may be employed, such as the cam arrangement shown in Patent No. 3,065,735. Of course, if desired, a different type of actuator piston position signal can be fed back, as later discussed herein.

Mechanical force position feedback means are shown as operatively interposed between the flapper 21 and the output stage valve spool 28. While such means may be variously constructed, the same are shown as comprising a tapered spring member 68 cantilever mounted at its upper end on the lower end of the vertically extending flapper 21. The lower end of this feedback spring member 68 is shown as provided with an enlarged spherical ball 69 arranged between the opposing walls of an annular groove 70 formed centrally in the center lobe 30 and having rolling contact on such walls in the same manner as explained in Patent No. 3,023,782.

The structure of servomechanism explained so far is the equivalent of the mechanical feedback flow control servovalve disclosed in said Patent No. 3,023,782 but additionally provided with mechanical feedback means between the actuator and input stage of the valve equivalent to that disclosed in said Patent No. 3,065,735.

In accordance wih the present invention, negative load pressure feedback means are operatively interposed between the load conduits 60, 62, and hence the respective actuator chambers 56, 58, and the input stage of the servovalve means, specifically the flapper 21 thereof. While such means may be variously constructed, the same are shown as comprising a spring-centered summing piston indicated generally at 71 arranged in a suitable chamber formed in the body 16. More specifically, the piston 71 has a central enlarged cylindrical portion 72 slidably arranged in a compartment so as to provide end chambers 73 and 74. The piston 71 is shown as having a pair of cylindrical stubs 75 and 76 extending coaxially outwardly from the ends of the enlarged central part 72. Thus, the summing piston 71 has a first pair of inner end areas 78, 78′ of equal size and a second pair of outer end areas 79, 79′ of equal size. The stubs 75, 76 are shown as extending severally into end chambers 80 and 81, each housing a spring 82 which bears against the corresponding end of the summing piston 71 and jointly tend to center such piston. The left chamber 80 is shown as having fluid conducting communication via a conduit 83 with the annular space 61, and hence right load conduit 62 and right actuator chamber 58. The right chamber 81 is shown as having fluid conducting communications via the conduit 84 with the annular space 59, and hence left load conduit 60 and left actuator chamber 56.

In this manner the load differential pressure between the actuator piston chambers 56 and 58 is fed back negatively to the summing piston end areas 79 and 79′. Such negative load pressure feedback is shown as being proportional. As well, the present invention contemplates negative load pressure feedback which is not proportional as may be provided if some sort of frequency sensitive network were operatively included in the negative pressure feedback means.

Also in accordance with the present invention, positive load pressure feedback means are operatively interposed between the load conduits 60, 62, and hence actuator piston chambers 56, 58 respectively, and the input stage of the valve means. Preferably, such positive load pressure feedback means include fluid accumulator means and fluid restrictor means arranged to provide a low pass frequency sensitive network. While such low pass frequency sensitive positive load pressure feedback means may be variously constructed, the same is shown as comprising a spring-centered accumulator piston 85 slidably arranged in a compartment formed in the body 16 so as to provide end chambers 86 and 88. In each such chamber a spring 89 is provided which bears against the piston 85 so as to tend to center the same. This piston is provided with equal end areas 90 and 90′ at opposite ends thereof.

Separate feedback conduit means are shown as establishing fluid conducting communication between the load conduits 60, 62 and the accumulator piston end chambers 86, 88, respectively. Thus a fluid conduit 91 having a restrictor 92 therein extends in fluid conducting communication between the left annular space 59 and the left chamber 86. Another feedback conduit 93 having a restrictor 94 therein is shown as extending in fluid conducting communication between the right annular space 61 and the right end chamber 88. The feedback conduit 83 is shown as being connected to the feedback conduit 93. In a similar manner, the feedback conduit 84 is shown as connected to the feedback conduit 91.

An additional pressure feedback conduit 87 is shown as establishing fluid conducting communication between the left chambers 73 and 86. A similar additional feedback conduit 95 is shown as establishing fluid conducting communication between the right chambers 74 and 88.

The pressure feedback conduits 83 and 84, corresponding to lines 8 and 9 of FIG. 2, are therefore applied to the piston outer end areas 79 and 79′. The pressure feedback conduits 87 and 95, corresponding to lines 12 and 13 of FIG. 2, are applied to piston inner end areas 78 and 78′. Interposed between these inner end areas 78, 78′ and the load pressure chambers 59, 61 are restricted orifice means 92 and 94 and accumulator means 85, 89 forming the low pass frequency sensitive network indicated schematically by elements 10 and 11 of FIG. 2. The right load chamber 61 is connected by conduit 83 to the left end chamber 80 of the summing piston and likewise the left load chamber 59 is connected via conduit 84 to the right end chamber 81 to provide negative load differential pressure feedback. Also, the right load chamber 61 connects via conduits 93 and 95 of the low pass network to the piston right inner chamber 74 and likewise the left load chamber 59 connects via conduits 91 and 87 to the piston left inner chamber 73. These latter two connections, then, supply a differential load pressure feedback on the summing piston 71 which has a polarity opposite to that of the negative load pressure feedback provided by conduits 83 and 84.

The negative and positive load pressure feedbacks are thus summed on the summing piston 71 and the net load pressure feedback is transmitted to the flapper 21 by a second feedback spring member 96. This second feedback spring member 96 is similar in construction to the first mentioned spring feedback member 68. Thus the member 96 has a tapered form terminating at its lower end in a spherical ball 98 arranged between the opposing walls provided by an annular groove 99 formed centrally in the summing piston 71 and this ball 98 has a frictionless rolling contact with such walls. The upper end of this second spring feedback member is cantilever mounted on the lower end of the flapper 21, alongside first spring feedback member 68 as shown in FIG. 5.

OPERATION OF FIGS. 3–5

It is assumed that the fluid supply line 39 is connected to a suitable source of pressurized fluid such as a pump (not shown), and the main return line 52 is connected to a main sump (not shown) which may supply fluid to the inlet of the undisclosed pump, so that a recirculating fluid circuit is provided.

With no command signal input in line 26, the flapper 21 will position itself between the nozzles 19 and 20 so as to produce upstream of these nozzles and in the spool end chambers 43 and 48 equal pressures thereby imposing no fluid drive on the valve spool 28. The command input signal may be electrical or mechanical but as illustrated the servo system is adapted for electrical command signals. If a signal of one sense is fed through the conductor 26, amplifier 25 and conductor 24 to the coils of the torque motor 18, the armature-flapper member 22, 21 will be induced to pivot as a result of the electromagnetic effect. This will cause the flapper 21 to move closer to one of the nozzles 19, 20 and differentially farther away from the other. The result is the production of different pressures in the passages 44, 49 which apply this differential pressure to the ends of the valve spool 28 so as to displace the same. With mechanical force feedback provided by the spring member 68, the valve spool 28 will normally displace until the spring member 68 is flexed to apply a centering torque on the armature-flapper member 22, 21 to counteract the decentering torque induced by the energization of the torque motor 18.

Let it be assumed that the sense of the electrical command input signal is such as to command a rightward or outward movement of the actuator piston rod 55 so as to increase the effective length of the actuator between the centers of its eyes 63 and 64. This requires the flapper 21 to swing counterclockwise so as to move closer to the right nozzle 20 and further away from the left nozzle 19. Thus the pressure in the right spool end chamber 48 will predominate over that in the left chamber 43 thereby urging displacement of the valve spool 28 in a leftward direction. Such leftward displacement will expose the left annular space 59 to communication with the left pressure port 35 and the right annular space 61 to communication with the return port 38. As a consequence pressurized fluid will enter the annular space 59, flow through the load conduit 60 into the left actuator chamber 56 thereby driving the actuator piston 54 rightward, fluid being displaced from the right actuator chamber 58 through the load conduit 62, annular space 61 and return port 38.

If the mass or inertia of the load sought to be moved by the actuator is relatively high, it will resist displacement which tends to increase the pressure of the fluid in left actuator chamber 56. This pressure is transmitted through left load conduit 60 into left annular space 59 and is sensed through the connected passages 91, 84 and 81 by the right summing piston end area 79'. The comparatively low load pressure in right actuator chamber 58 is transmitted through right load conduit 62 to right annular space 61 where it is sensed through the connected passages 93, 83 and 80 by the left end area 79 of the summing piston. This pressure feedback effect tends to urge the summing piston 71 to the left and this applies a clockwise torque on the flapper 21, which is negative with respect to the assumed torque from the electrical command input signal.

The low pass frequency sensitive network provided by the spring-centered accumulator piston 85 and the fluid restrictors 92, 94 and associated lines leading to the chambers 73, 74, will transmit a positive pressure feedback effect on the end areas 78, 78' of the summing piston 71. Thus, considering a static load condition with the pressure in left actuator chamber 56 predominating over that in right actuator chamber 58, the high load pressure will be transmitted through the connected passages 60, 59, 91, 92, 86, 87 and 73 to the left end area 78 of the summing piston 71, whereas the comparatively low load pressure will be transmitted from right actuator chamber 58 through connected passages 62, 61, 93, 94, 88, 95 and 74 to right end area 78' of the summing piston 71. This load pressure feedback effect will tend to urge the summing piston 71 to the right thereby aiding the electrical command input signal, this being a positive feedback effect.

The negative load pressure feedback effect applied to the areas 79, 79' and the positive load pressure feedback effect applied to the areas 78, 78' will be summed on the spool 71 to produce a resultant displacement of this summing piston 71 depending upon the ratio of the areas 78 and 79 to each other. The same is true of the corresponding areas 78', 79'.

For a purpose hereinafter explained more fully, it is preferred that the summing piston end areas 78, 78' be larger than the areas 79, 79' so that the positive pressure feedback effect predominates over the negative pressure feedback effect when the positive pressure feedback is passed by the frequency sensitive network. Assuming this situation to obtain, it will be seen that the summing piston 71 will be displaced to the right thereby flexing the feedback spring member 96 which transmits this net feedback effect as a force to the flapper 21. In the example being explained, it was assumed that the valve spool 28 was displaced to the left and that the summing piston 71 was displaced to the right from their respective centered positions illustrated in FIG. 4. In such a situation, the valve spool position feedback spring member 68 will tend to recenter the flapper 21, whereas the flexing of the summing piston position feedback spring member 96 will tend to decenter the flapper 21.

It is understood, of course, that the position feedback means 65, 66 in conjunction with the valve input stage provides a position servoloop, here of a mechanical force feedback nature, to provide a position feedback signal which tends to recenter the flapper 21 when the position commanded by the input signal is achieved. Thus the flapper 21 serves as a summing member for all feedback effects.

From the foregoing, it will be seen that if the load oscillates so that the predominant pressure as a result of load reaction alternates between the actuator chambers 56 and 58, the load pressures at any given time will be fed back negatively in a proportional manner, and positively through a low pass frequency sensitive network so that these load pressure feedback effects will be summed and the net load pressure feedback effect be transmitted to the flapper 21. The positive load pressure feedback before being effective must first pass the frequency sensitive network comprised of 92, 94, 85 and 89, which is progressively more difficult above the corner frequency of the network.

The corner frequency of the low pass frequency sensitive positive load pressure network is preferably set comfortably below the resonant frequency of the load, say about one-third. Corner frequency is adjusted by relating the effective areas 90 and 90' of the accumulator piston 85 to the areas of the restricted orifices 92 and 94, together with the rates of the springs 82, in a manner known to those skilled in the art.

It is also preferred that the areas 78, 78' be larger than the corresponding areas 79, 79' of the summing piston 71 such that the positive load pressure feedback effect will predominate over the negative load pressure feedback effect below the corner frequency of the low pass filter network under static load conditions so as to compensate for the deflection of the supporting structure external of the positioning servomechanism. As the frequency of the load increases, the transition from positive to negative pressure feedback is permitted so that this negative feedback effect can be used for damping. In this manner, static load error washout is provided.

FIGS. 6–7

Figure 6:
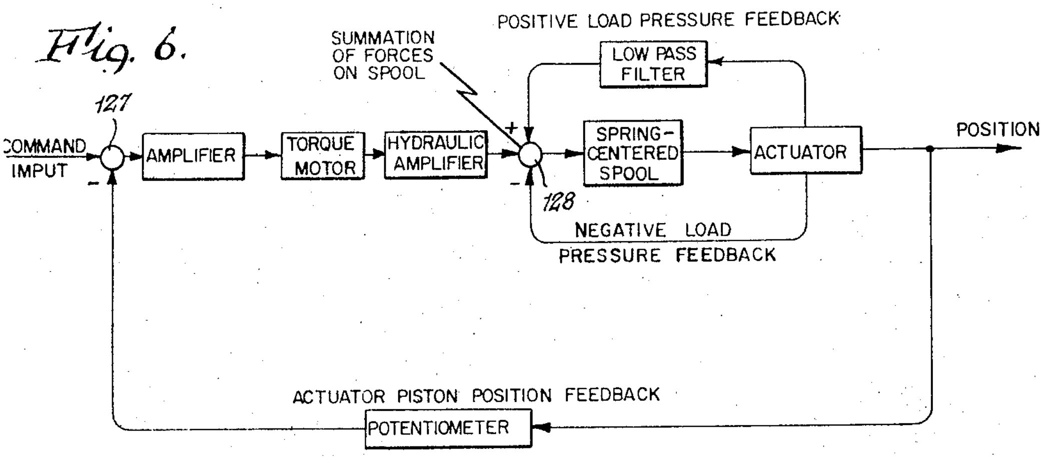
FIG. 6 is a block diagram of a positioning servomechanism embodying a second form of the present invention.
Figure 7:
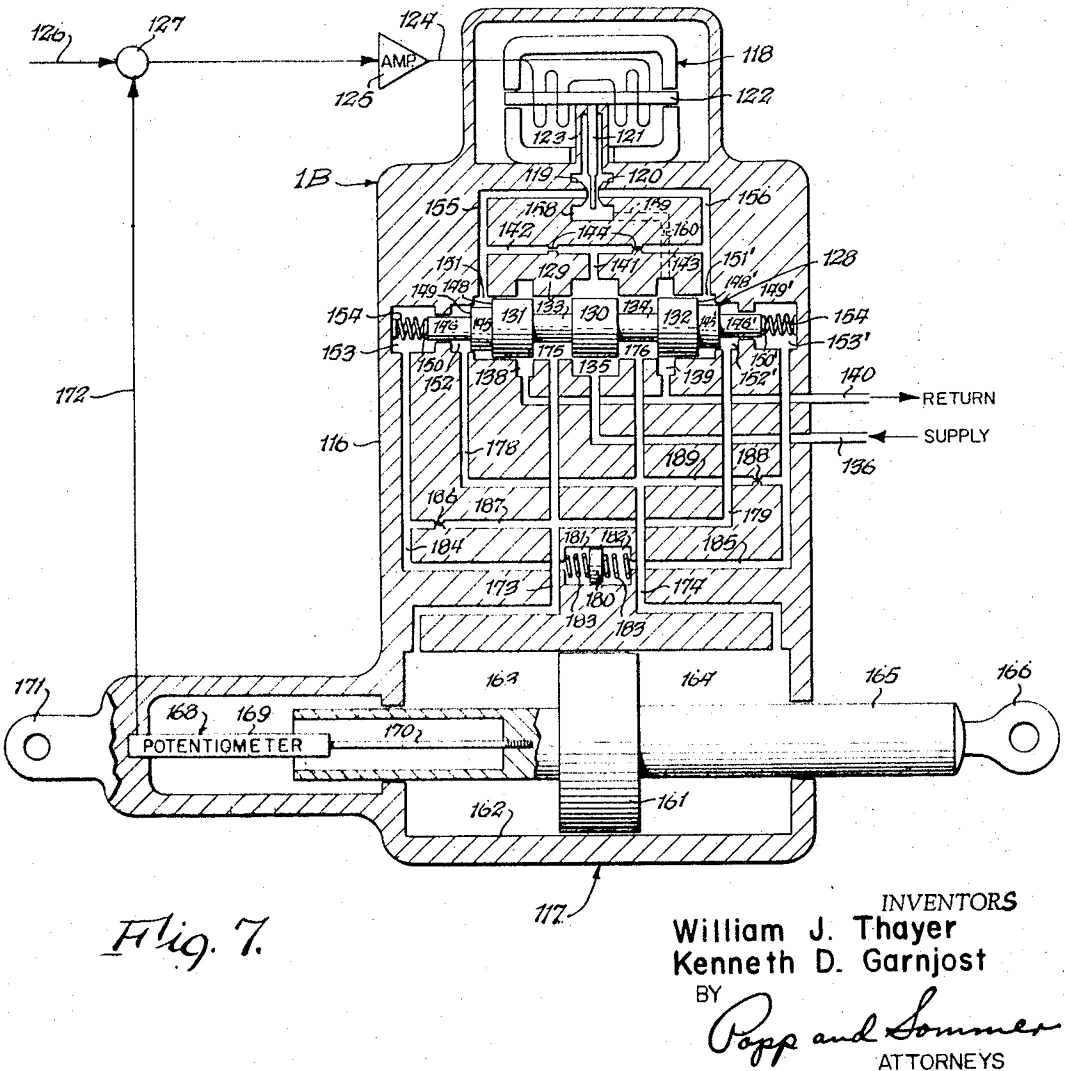
FIG. 7 is a diagrammatic central vertical longitudinal sectional view of a servomechanism constructed according to FIG. 6.

The second form of the invention shown in FIG. 7 and block diagrammed in FIG. 6 is characterized by the negative and positive load pressure feedbacks being summed on the valve spool and also illustrates actuator piston position feedback to the valve input stage as electrical.

Referring to FIG. 7, the numeral 1B represents the servomechanism generally which includes a body 116, a torque motor 118, a pair of nozzles 119, 120, a flapper 121, an armature 122, the armature-flapper member being pivotally mounted on a flexure tube 123. The input to the coils of the torque motor 118 is transmitted via the conductor 124 having an amplifier 125 operatively arranged therein and leading from a summing point 127 to which is fed the command input signal represented by the arrow 126. The nozzles 119, 120 in combination with the flapper 121 provide a fluid amplifier which together with the torque motor 118 with its armature 122 provide the input stage means of the servomechanism. The output stage means of the servomechanism 1B includes a valve spool 128 slidably arranged in a compartment generally designated 129 provided in the body 116. This valve spool is shown as including a central lobe 130 and end lobes 131, 132 separated from the central lobe by reduced left and right stem portions 133 and 134, respectively. When the valve spool 128 is in its centered or null position as illustrated, the central lobe 130 closes an annular pressure port 135 which is in fluid conducting communication with a supply conduit 136. The end lobes 131 and 132 cover annular return ports 138 and 139, respectively. Both these return ports are in fluid conducting communication with a main return conduit 140.

The pressure port 135 is annular and from it extends a conduit 141 which divides to provide two branch conduits 142 and 143. A fluid restrictor 144 is shown as arranged in each of the branch conduits 142 and 143.

The valve spool 128 is shown as provided with first and second pairs of co-axial stub-shafts at opposite ends, the first pair of stub-shafts being 145, 145', and the second pair being 146, 146'. In this manner the valve spool at each end is provided with three end areas, one pair of end areas being indicated at 148, 148', the second pair at 149, 149' and the third pair being 150 and 150'.

The compartment 129 housing the valve spool 128 is formed so as to provide a pair of drive chambers 151, 151' a pair of negative pressure feedback chambers 152, 152' and a pair of positive pressure feedback chambers 153, 153'. A spring 154 is shown as arranged in each of the chambers 153, 153' between its outer end wall and the corresponding spool end area 150 or 150'. These springs 154 tend to center the valve spool 128.

The nozzles 119, 120 are severally in communication with the fluid drive chambers 151, 151' via the conduits 155 and 156, respectively. The left conduit 155 is intercepted intermediate its ends by the left branch conduit 142. Similarly the right conduit 156 is intercepted intermediate its ends by the right branch conduit 143. The nozzles 119, 120 discharge fluid into a sump chamber 158 which is shown as communicating with the right return port 139 via a conduit 159 having a restrictor or restricted orifice 160 therein to prevent surges.

The actuator means of the servomechanism 1B is represented generally by the numeral 117 and includes an actuator piston 161 slidably arranged in a compartment 162 formed within the body 116 to provide a pair of actuator chambers 163, 164 on opposite sides of the actuator piston. This piston is also shown as mounted on a rod 165 which extends outwardly of the servomechanism body and is formed at its outer end with an attaching eye 166. The opposite or inner end of the piston rod 165 is shown as having a recess to accommodate an electrical position feedback means indicated generally at 168 which may have any suitable construction. It is illustrated as a potentiometer having a stationary member 169 and a movable member 170. The stationary member is connected to the actuator body portion which has a lateral extension formed to provide an attaching eye 171. The movable member 170 is shown as being attached to the actuator piston rod 165 so as to move therewith. The potentiometer 168 is arranged to produce an electrical actuator piston position feedback signal which is transmitted to the summing point 127 via a conductor represented by the line 172.

The valve spool 128 controls the flow of fluid through load conduits 173 and 174. The left load conduit 173 at one end communicates with the annular space 175 surrounding the left spool stem portion 133 and at its opposite end with the left actuator chamber 163. The right load conduit 174 communicates at one end with the annular space 176 surrounding the right spool stem portion 134 and at its other end with the right actuator chamber 164.

In accordance with the present invention, negative load pressure feedback means are operatively interposed between the actuator means 117 and the output stage valve spool means 128 of the servovalve means. Thus a left negative feedback conduit 178 establishes fluid conducting communication between the right load conduit 174 and the left negative pressure feedback chamber 152. A right negative feedback conduit 179 establishes fluid conducting communication between the left load conduit 173 and the right negative feedback chamber 152'.

Also in accordance with the present invention, positive load pressure feedback means are operatively interposed between the actuator means 117 and the output stage valve spool means 128 of the servovalve means. As shown, such positive load pressure feedback means preferably provides a low pass filtering function. The positive load pressure feedback means include fluid accumulator means and fluid restrictor means arranged in a low pass frequency sensitive network.

The fluid accumulator means is shown as comprising a spring-centered piston 180 arranged in a compartment formed in the body 116 to provide chambers 181 and 182 on opposite sides of the accumulator piston. A spring 183 is arranged on opposite sides of the accumulator piston 180 within the corresponding end chamber 181 and 182. The left chamber 181 is shown as being in fluid conducting communication with the left positive pressure feedback spool end chamber 153 via a conduit 184. A similar conduit 185 establishes fluid conducting communication between the right accumulator end chamber 182 and the right positive pressure feedback spool end chamber 153'.

The fluid restrictor means is shown as comprising a first fluid restrictor 186 arranged in a branch conduit 187 which establishes fluid conducting communication between the left load conduit 173 and the left feedback conduit 184. A similar fluid restrictor 188 arranged in a branch conduit 189 is shown as establishing fluid conducting communication between the right load conduit 174 and the right feedback conduit 185.

In this second form of the invention shown in FIG. 7, the positive pressure end areas 150, 150' on the valve spool 128 are preferably larger than the negative pressure end areas 149, 149' for the same reason discussed previously in connection with the first form of the invention shown in FIG. 4.

Under static load conditions, it will be seen that the load pressure differential which obtains at any time in the load conduits 173, 174 is applied negatively through the feedback conduits 179, 178, respectively, to the negative feedback areas 149, 149' on the valve spool 128, such negative pressure feedback being effective to move the valve spool toward a null position in opposition to displacement induced by the command input signal.

On the other hand, and still considering static load conditions, the load pressure differential is transmitted from the left load conduit 173 via the connected passages 187, 186, 184 and 153 to the left positive feedback end area 150 on the valve spool 128, while the connected passages 189, 188, 185, 153' transmit the pressure in the right load conduit 174 to the right positive feedback end area 150' on the valve spool. The ratio of the positive feedback end area 150 to the negative feedback end area 149, and similarly for the corresponding areas 150' and 149', will determine the extent of predominance of the positive pressure feedback effect below the corner frequency of the frequency sensitive network provided by the fluid accumulator and restrictor means. As previously explained, this will be designed to compensate for deflection of the supporting structure under static load.

In the form of the invention shown in FIG. 7, the position servoloop includes electrical feedback means rather than mechanical feedback means as in the case of the first form of the invention shown in FIG. 4. However, the effect is the same in that with the device shown in FIG. 7, the electrical position feedback signal transmitted via conductor 172 is of opposite polarity to the electrical command input signal transmitted through line 126 so that the input to the torque motor 118 via conductor 124 is reduced as the actuator piston 161 approaches its intended position.

From the foregoing it will be seen that the servomechanism 1B shown in FIG. 7 functions in an equivalent manner to the servomechanism 1A shown in FIG. 4. The only significant difference is that in FIG. 7, the negative and positive load pressure feedback effects are summed on the valve spool 128 which controls flow of drive fluid with respect to the actuator piston 161. This is possible because the valve spool 128 is spring-centered whereas the valve spool 28 in the servomechanism 1A shown in FIG. 2 is not spring-centered and cannot be employed as a summing member. Rather, in FIG. 4, the summing piston 71 was especially provided for summing the negative and positive load pressure effects and the net pressure feedback effect was then transmitted to the flapper 21 which was used to sum this effect with the valve spool position force feedback effect as well as the actuator piston position force feedback effect. It is to be clearly understood that mechanical actuator piston position feedback could have been used in servomechanism 1B, just as electrical actuator piston position feedback could have been used in servomechanism 1A.

FIGS. 8–9

Figure 8:
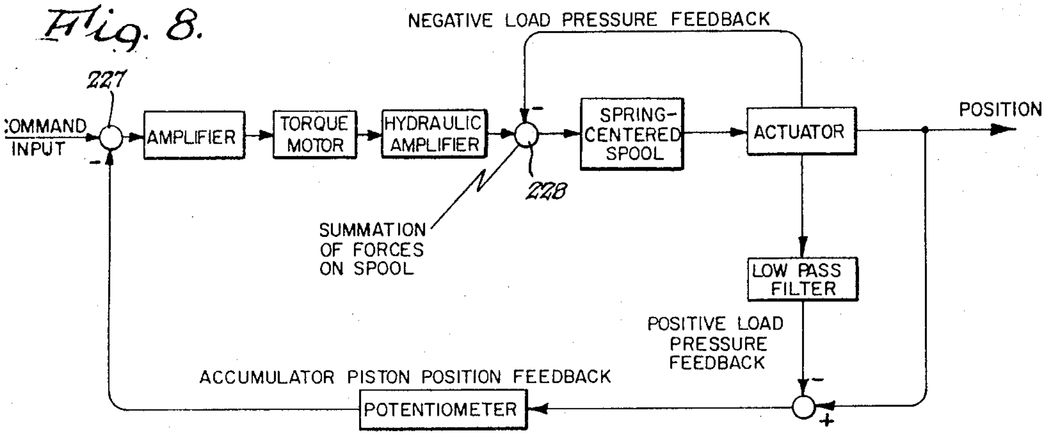
FIG. 8 is a block diagram of a positioning servomechanism embodying a third form of the present invention.
Figure 9:
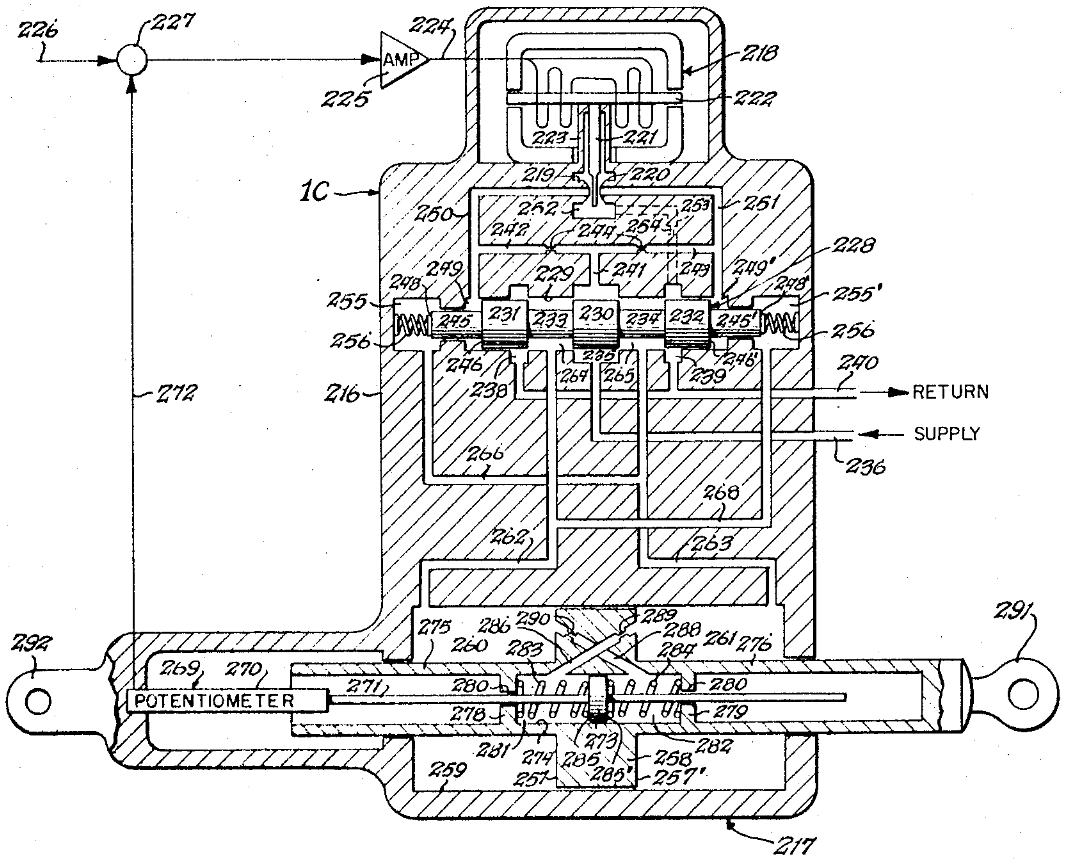
FIG. 9 is a diagrammatic central vertical longitudinal sectional view of a servomechanism constructed according to FIG. 8.

The third form of the invention shown in FIG. 9 and block diagrammed in FIG. 8 is characterized by the feature that one of the load pressure feedbacks, specifically the positive, is applied to the input stage of the servovalve means indirectly through the actuator position servoloop, whereas the other load pressure feedback, specifically the negative, is applied to the output stage valve spool.

The servomechanism 1C shown in FIG. 9 has a body 216 formed with suitable compartments and passages, including a compartment to house a torque motor 218 of the input stage means of the servovalve means. This input stage means is shown as also including a pair of nozzles 219, 220 between which a flapper 221 is movably arranged. This flapper is fixedly connected to an armature 222 of the torque motor. The armature-flapper member 222, 221 so provided is pivotally mounted on a flexure tube 223 and is electromagnetically induced to move by coils forming part of the torque motor. The signal for these coils is supplied through the conductor 224 in which an amplifier 225 is arranged. This amplifier is operatively associated with a command input signal conductor 226 and a summing point 227.

The output stage means of the servovalve means is shown as comprising a valve spool indicated generally at 228 slidably arranged in a compartment 229 formed in the body 216. The valve spool 228 is shown as including a central lobe 230 and end lobes 231 and 232 separated from the central lobe by left and right stem portions 233 and 234, respectively. When the valve spool 228 is in a centered or null position as illustrated, the central lobe 230 closes an annular pressure port 235 to which pressurized fluid is supplied through the supply conduit 236. Also when the valve spool 228 is in this null position, its end lobes 231 and 232 close a pair of left and right annular return ports 238 and 239, respectively, these ports being in fluid conducting communication with a main return conduit 240. The pressure port 235 has a conduit 241 leading therefrom which divides into two branch conduits 242 and 243 each of which has a fluid restrictor 244 therein.

The valve spool 228 is shown as having a pair of coaxial stub shafts 245, 245′ extending outwardly from opposite ends of the valve spool. This provides a first pair of spool end areas 246, 246′ and a second pair of spool end areas 248, 248′. The end areas 246, 246′ define in part fluid drive chambers 249, 249′. The left chamber 249 communicates with the left nozzle 219 via a conduit 250 which also connects with the left branch conduit 242. The right chamber 249′ communicates with the right nozzle 220 via a conduit 251 to which the branch conduit 243 is also connected. The nozzles 219, 220 discharge fluid into a sump chamber 252 which is shown as communicating via a conduit 253 having a restrictor 254 therein with the right annular return port 239.

The spool end areas 248, 248′ project into feedback chambers 255, 255′ formed in the body 216. Each such chamber houses a spring 256 which is operatively interposed between the body 216 and the corresponding spool end. In this manner a spring-centered valve spool is provided.

The actuator means on the servomechanism 1C is represented generally by the numeral 217 and is shown as including an actuator piston 258 slidably arranged in a compartment 259 formed in the body 216 to provide a pair of actuator chambers 260 and 261 on opposite sides of the piston. A pair of load conduits 262, 263 severally lead from the actuator chambers 260, 261 to annular spaces 264, 265 surrounding the left and right stem portions 233, 234, respectively, of the valve spool 228. The actuator piston 258 has left and right annular end faces 257 and 257′, respectively, of equal area.

Negative load pressure feedback means are operatively interposed between the load conduits 262, 263 and the feedback chambers 255, 255′. Thus a first feedback conduit 266 is shown as establishing fluid conducting communication between the right load conduit 263 and the left feedback chamber 255. A second feedback conduit 268 establishes fluid communication between the left load conduit 262 and the right feedback chamber 255′.

Positive load pressure feedback means are operatively interposed between the actuator means 217 and the servovalve means but indirectly through the actuator position servoloop. Electrical position feedback is shown provided in the servomechanism 1C. This is achieved by transducer means shown as comprising a potentiometer 269 including a stationary part 270 and a movable part 271. A conductor 272 operatively connects the potentiometer 269 with the summing point 227.

The positive load pressure feedback means are operatively interposed between the actuator means 217 and the position feedback means 269. Such positive load pressure feedback means is preferably constructed so as to provide a low pass frequency sensitive network shown as comprising a spring-centered accumulator piston 273 slidably arranged in a compartment 274 provided internally within the actuator piston 258 and its associated left and right piston rod portions 275, and 276, respectively. These rod portions 275, 276 are shown as being hollow except for a pair of axially spaced transverse walls 278, 279 severally having alined central holes 280 through which the movable potentiometer part 271 extends so as to be guided during relative reciprocable movement. This part 271 is shown as a rod extending completely through the end walls 278, 279 of the compartment 274 and the accumulator piston 273 is fixedly mounted on this rod 271 intermediate the end walls so as to divide the compartment into a left chamber 281 and a right chamber 282. A first centering spring 283 is arranged in the left chamber 281 and a second spring 284 is arranged in the right chamber 282. These springs bear against the end walls 278, 279 at their outer ends and at their inner ends against the opposite end faces 285, 285′ of the accumulator piston 273. The springs 283, 284 serve to center the accumulator piston 273. Thus the spring-centered accumulator piston 273 provides fluid accumulator means.

Fluid restrictor means are operatively associated with such fluid restrictor means. The fluid restrictor means are shown as comprising a pair of feedback conduits 286, 288 having restrictors 289, 290, respectively, therein. The feedback conduit 286 extends from the left accumulator chamber 281 diagonally to right actuator piston end face 257 and establishes fluid conducting communication between this chamber and the right actuator chamber 261, whereas the other feedback conduit 288 extends from the right accumulator chamber 282 diagonally to left actuator piston end face 257 and establishes fluid conducting communication between this chamber and the left actuator chamber 260.

The right actuator piston rod portion 276 is shown as extending externally of the body 216 and formed at its outer end to provide an attaching eye 291. Remotely, the body 216 is formed to provide an attaching eye 292.

In the operation of the servomechanism 1C shown in FIG. 9, the input stage means of the servovalve means will apply a pressure differential to the spool end areas 246, 246' so as to tend to displace the valve spool 228 in response to an electrical command input signal applied by conductor 226. As the actuator piston 258 moves to achieve the position commanded, an electrical actuator position feedback signal is generated and fed back to summing point 227 and has a polarity opposite from that of the command input signal. These electrical signals are summed at point 227 and the net signal is fed through conductor 224 to torque motor 218.

If the servomechanism is subjected to a static load, this establishes a difference between the load pressures in the actuator chambers 260, 261. The load pressure in left actuator chamber 260 is transmitted via the connected passages 262, 268 and 255' to the right spool end area 248', whereas the load pressure in the right actuator chamber 261 is transmitted via the connected passages 263, 266 and 255, to the left spool end area 248. Such arrangement provides proportional load pressure feedback on the valve spool 228.

Below the corner frequency of the low pass filter means, the load pressure in left actuator chamber 260 is transmitted to right accumulator chamber 282, and the load pressure in right actuator chamber 261 is transmitted to left accumulator chamber 281 so as to apply a pressure differential upon the opposite end faces 285, 285' of the accumulator piston 273. This pressure differential in response to the load pressure differential will displace the accumulator piston 273 relative to the actuator piston 258. The consequence of this is to move the potentiometer member 271 a like amount relative to the fixed potentiometer member 270. This relative movement will modify the operation of the potentiometer 269 tending to decrease the effective actuator position feedback signal being transmitted by conductor 272.

Assume, for example, the load pressure in left actuator chamber 260 is higher than that in right actuator chamber 261. This will place the higher load pressure in right accumulator chamber 282 than in left accumulator chamber 281, thereby driving the accumulator piston 273 to the left relative to the actuator piston 258 against the urging of the centering springs 283, 284. The effect of this is to tend to indicate to the potentiometer 269 that the actuator piston 258 has not moved as far as it should have. This is positive load pressure feedback. The presence of the fluid restrictors 289, 290 make such positive load pressure feedback frequency sensitive and in combination with the fluid accumulator means provide a low pass frequency sensitive positive load pressure feedback means.

The sensitivity of the system to positive load pressure feedback is determined by the combined gains of the potentiometer 269, the amplifier 225, the torque motor 218 and the size of the areas of the accumulator piston end faces 285, 285' and the spring rates of springs 283 and 284.

FIGS. 10–11

Figure 10:
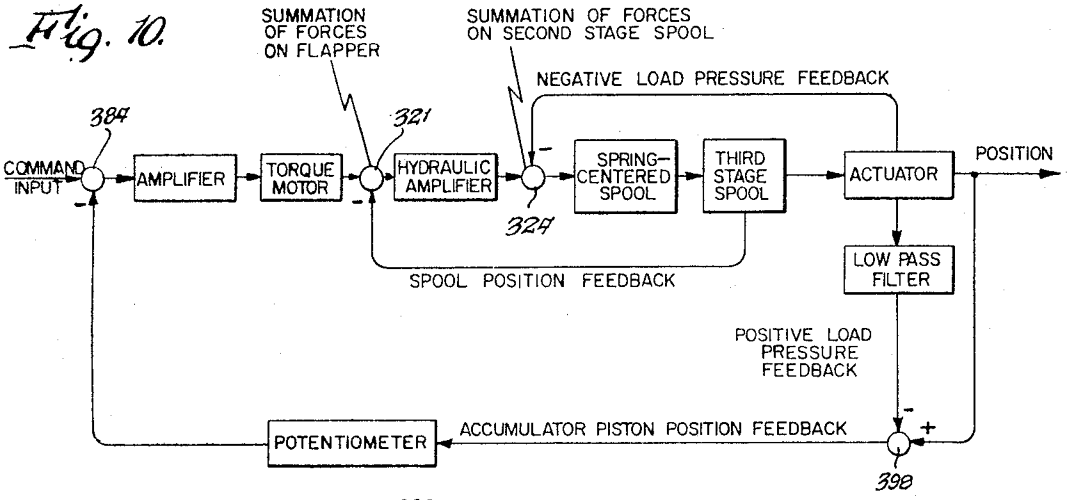
FIG. 10 is a block diagram of a positioning servomechanism embodying a fourth form of the present invention.
Figure 11:
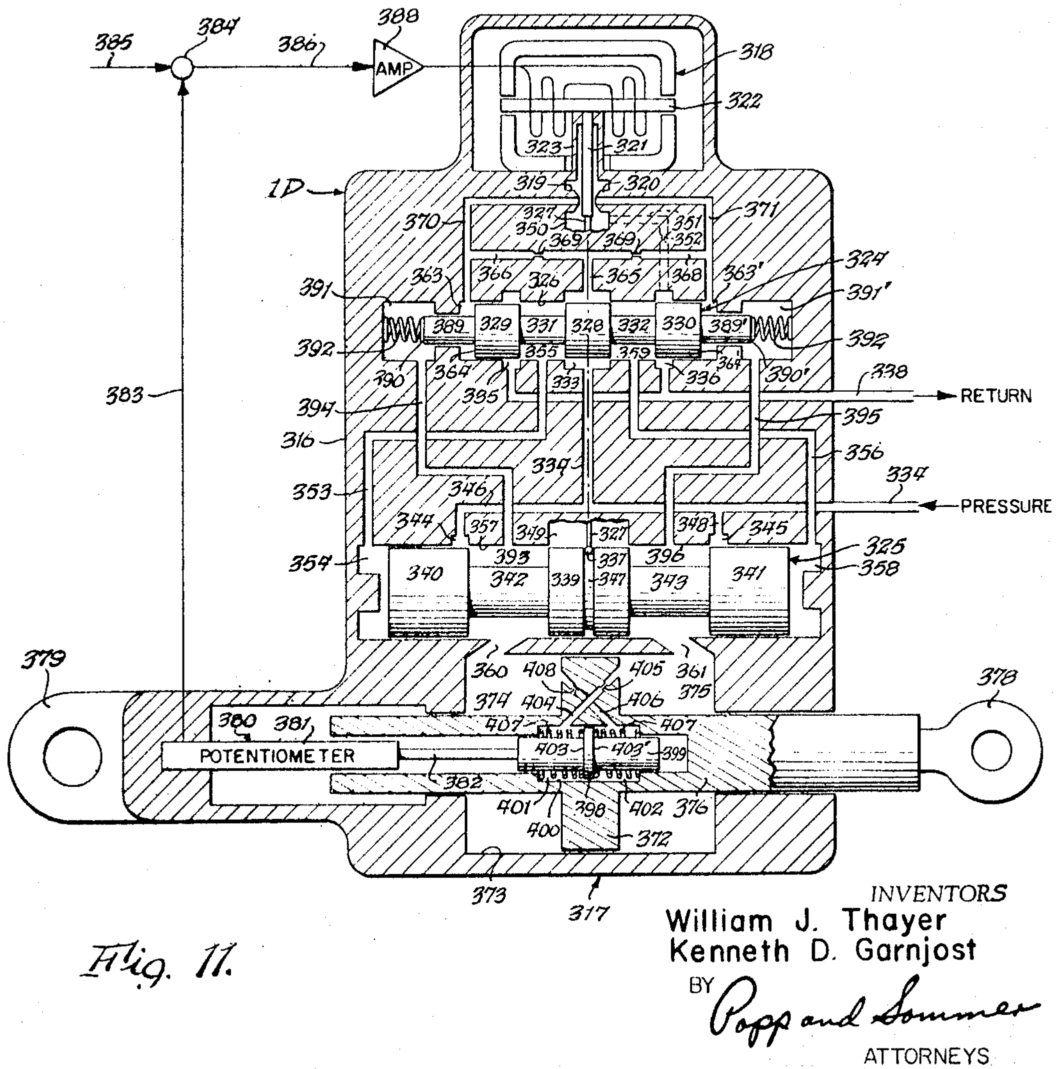
FIG. 11 is a diagrammatic central vertical longitudinal sectional view of a servomechanism constructed according to FIG. 10.

The fourth form of the invention shown in FIG. 11 and block diagrammed in FIG. 10 is characterized by the fact that the servomechanism identified generally as 1D includes a three stage servovalve means with one of the load pressure feedbacks, specifically the negative, being applied to the second stage and the other load pressure feedback, specifically the positive, being applied to the input stage indirectly through the actuator position servoloop.

Referring to FIG. 11, the servomechanism 1D is shown as having a body 316 which houses an input stage means comprising a torque motor 318 and a fluid amplifier means which includes a pair of nozzles 319, 320 and a flapper 321 movably arranged between the nozzles. The torque motor includes an armature 322 which is rigidly connected to the flapper 321. The armature-flapper member 322, 321 so provided is movably arranged for pivotal movement on a flexure tube 323.

The servovalve means is also shown as including a second or intermediate stage means comprising a spring-centered valve spool indicated generally at 324, and also a third or output stage means including a valve spool indicated generally at 325.

The second stage valve member 324 is shown as slidably arranged in a suitable compartment 326 formed in the body 316. This valve spool 324 is shown as including a central lobe 328 and axially spaced end lobes 329, 330. The lobes 328 and 329 are separated by an intermediate left stem portion 331 of reduced diameter. A similar but right stem portion 332 connects the lobes 328 and 330. When the valve spool 324 is in a centered or null position as illustrated, the central lobe 328 closes an annular pressure port 333 which communicates with a supply conduit 334 for pressurized fluid, and the end lobes 329, 330 close left and right annular return ports 335 and 336, respectively, which communicate with a main return conduit 338.

The output stage value spool 325 is shown as comprising a central lobe 339, axially spaced end lobes 340, 341 and intermediate left and right stem portions 342, 343, respectively, of reduced diameter. The valve spool 325 is slidably arranged in a suitable compartment 357 formed in the body 316. When the output stage valve spool 325 is in its centered or null position as shown, the left end lobe 340 closes a left pressure port 344 and the right end lobe 341 closes a right pressure port 345. These ports 344, 345 communicate via branch conduits 346 and 348, respectively, with the main supply conduit 334. Also when in this null position, the central lobe 339 of the output stage valve spool 325 closes a return port 349 which communicates with a sump chamber 350 into which the nozzles 319, 320 discharge fluid. This sump chamber is shown as being in fluid conducting communication with the annular return port 336 via a branch return conduit 351 having a restricted orifice 352 arranged therein.

The second stage valve spool 324 controls the flow of fluid for driving the third stage valve spool 325. For this purpose, a left drive fluid condiut 353 is shown as establishing fluid conducting communication between a left drive chamber 354 at the end of the third stage valve spool 325 and the annular space 355 surrounding the left stem portion 331 of the second stage valve spool 324. A right fluid drive conduit 356 establishes fluid conducting communication between a right drive chamber 358 at the end of valve spool 325 and the annular space 359 surrounding the right annular stem portion 332 of the valve spool 324. The output stage valve spool 325 controls the flow of fluid through a pair of load conduits 360 and 361 leading to actuator means indicated generally at 317.

Position feedback means are operatively interposed between the third stage valve spool 325 and the first stage means. Such third stage spool position feedback means are shown as comprising a feedback spring member 327 at one end cantilever mounted on the flapper 321 and at its other end being constrained through a frictionless connection to move with the valve spool 325. This frictionless connection is provided by a spherical ball 337 formed on the lower end of the spring member 327 and having a rolling contact with the opposing walls of an annular groove 347 formed in central lobe 339.

The first or input stage means of the servovalve means controls the flow of fluid to the second stage valve spool 324. For this purpose the compartment 326 is formed to provide left and right spool end drive chambers 363 and 363', respectively. These chambers are defined in part by end areas 364, 364' formed on the outer end faces of the end lobes 329, 330, respectively. A conduit 365 is shown as communicating with the pressure port 333 and being divided into left and right branch conduits 366 and 368, respectively, in each of which a fluid restrictor 369 is arranged. A left conduit 370 establishes fluid conducting communication between the left nozzle 319 and the left drive chamber 363, this conduit 370 also communicating with the left branch conduit 366. A similar but right conduit 371 establishes fluid conducting communication between the right nozzle 320 and the right branch conduit 368 and right drive chamber 363'.

The actuator means 317 is shown as comprising an actuator piston 372 slidably arranged in a compartment 373 formed in the body 316, thereby providing a left actuator chamber 374 and a right actuator chamber 375. The actuator piston 372 is mounted on a piston rod 376 intermediate its ends and the right end extends outwardly through a hole in the body 316 and terminates in an attaching eye 378 at its outer end. The body 316 remote from the eye 378 is formed to provide an attaching eye 379.

Position feedback means are operatively interposed between the actuator means 317 and the torque motor 318 of the input stage means of the servovalve means. Such actuator position feedback means are shown as including a potentiometer 380 having a stationary part 381 and a movable part 382. An electrical conductor 383 connects the potentiometer 380 with a summing point 384 to which a command input signal is fed via the conductor 385. The actuator position feedback signal fed by the conductor 383 has a polarity opposite to that of the command input signal fed through line 385. The net of these signals is fed via a conductor 386 to the coils of the torque motor 318, an amplifier 388 being shown arranged in the conductor line 386.

In accordance with the present invention, negative load pressure feedback means are operatively interposed between the load conduits 360, 361 and the second stage valve spool 324. As shown, negative load pressure feedback is achieved by providing a pair of stub shafts 389, 389' of reduced diameter on opposite ends on the second stage valve spool 324 so that the outer ends of these stub shafts provide end areas 390, 390'. The outer end portions of these stub shafts 389, 389' are shown as being arranged in left and right feedback chambers 391, 391', respectively. A spring 392 is shown as arranged between the outer end wall of each of the chambers 391, 391' and the corresponding spool end area 390 or 390'. The left chamber 391 has fluid conducting communication with annular space 393 surrounding the left stem portion 342 of third stage valve spool 325, in turn communicating with the left load conduit 360, via a left negative pressure feedback conduit 394. In a similar fashion a right feedback conduit 395 establishes fluid conducting communication between the right feedback chamber 391' and annular space 396 surrounding the right stem portion 343 of valve spool 325, this annular space 396 communicating with the right load conduit 361. Thus proportional negative load pressure feedback is applied to the spring-centered second stage valve spool 324.

Positive load pressure feedback means are operatively interposed between the actuator means 317 and the actuator position feedback means 380. Such positive load pressure feedback means is preferably frequency sensitive and hence is shown as including fluid accumulator means and fluid restrictor means which jointly provide a low pass frequency sensitive network. The fluid accumulator means is shown as comprising an accumulator piston 398 formed as an enlarged central head on a slidable cylindrical rod 399 which at one end is connected to the movable member 382 of the potentiometer 380. The accumulator piston 398 is slidably arranged in a compartment 400 formed in the actuator piston and rod assembly 372, 376, thereby providing a left accumulator chamber 401 and a right accumulator chamber 402. A spring 407 is shown arranged in each of the chambers 401, 402 and these springs cooperate to center the accumulator piston 398, bearing against the opposite end faces 403, 403' thereof. The fluid restrictor means are shown as including a first conduit 404 establishing fluid conducting communication between the right actuator chamber 375 and the left accumulator chamber 401, and has a restricted orifice 405 provided in such conduit. A similar conduit 406 having a restricted orifice 408 therein establishes fluid conducting communication between the left actuator chamber 374 and the right accumulator chamber 402.

It will be seen that the input stage means of the servovalve means which includes the torque motor 318 and the fluid amplified comprising the nozzles 319, 320 and flapper 321, operate to apply to the second stage valve spool 324 a fluid drive in response to the command signal input fed through input line 385. This second stage valve spool 324 controls the flow of fluid for driving the output stage valve spool 325. This output stage valve spool 325 controls the flow of fluid through the load conduits 360, 361 to the actuator means 362.

The construction of servomechanism 1D shown in FIG. 11 provides proportional negative load pressure feedback on the second stage valve spool 324 and also provides low pass frequency sensitive positive load pressure feedback network between the actuator means 317 and the actuator position feedback means 380. In this manner by proportioning the various parts as discussed in connection with servomechanism 1C shown in FIG. 9, the servomechanism 1D can correct for deflection of internal and external compliance under static load conditions and still provide a damping effect at higher frequencies of dynamic load action.

From the foregoing it will be seen that each of the four forms of positioning servomechanism illustrated and described achieves static load error washout by combining a proportional load pressure feedback in parallel with a low pass frequency sensitive load pressure feedback having the opposite polarity. Any number of mechanical, hydraulic or electrical combinations of the two load pressure feedbacks can be utilized for the same functional result without departing from the spirit of the present invention.

Also, other mechanizations involving both positive and negative load pressure feedback but with different frequency sensitive networks could be substituted to achieve the same functional result. For example, a proportional positive load pressure feedback could be combined with a high pass negative load pressure feedback. With such an arrangement, the positive load pressure feedback would predominate under static conditions ot give the benefits of structural deflection error washout; but with dynamic load pressure variations, the negative load pressure feedback would be effective to contribute damping of load resonance.

In this latter connection, it is pointed out that negative load pressure feedback is not required where there is no load damping problem. Where there is no underdamped load resonance, the technique of applying positive load pressure feedback through a low pass frequency sensitive network disclosed hereinabove for compensation of errors due to structural deflection under load may be used solely so that the mechanizations shown in FIGS. 4, 7, 9 and 11 could be utilized without the proportional negative load pressure feedback.

While a valve spool has been shown in each of the embodiments illustrated as controlling the flow of fluid through both load conduits severally communicating with opposite sides of a movable actuator element, it will be understood that flow of fluid through only one load conduit need be controlled if a constant pressure is applied in the other load conduit and the fluid contacted surfaces on opposite sides of the actuator element have different areas, the smaller area being contacted by the constant pressure. Thus the valve means needs to control fluid flow through at least one of a pair of load conduits, depending upon the design of valve and actuator.

Accordingly, the invention is not limited in scope except as defined in the appended claims.

What is claimed is:

1. In a servomechanism, the combination comprising valve means including input stage means and output stage fluid flow control means, load actuator means driven by fluid flow controlled by said output stage means, position feedback means operatively interposed between said actuator means and said input stage means, negative load pressure feedback means operatively interposed between said actuator means and said valve means, and positive load pressure feedback means operatively interposed between said actuator means and said valve means.

2. The combination according to claim 1 wherein said negative load pressure feedback means are operatively interposed between said actuator means and said input stage means of said valve means.

3. The combination according to claim 2 wherein said positive load pressure feedback means are operatively interposed between said actuator means and said input stage means of said valve means.

4. The combination according to claim 1 wherein said positive load pressure feedback means are operatively interposed between said actuator means and said input stage means of said valve means.

5. The combination according to claim 1 wherein said negative load pressure feedback means are operatively interposed between said actuator means and said output stage means of said valve means.

6. The combination according to claim 1 wherein said positive load presure feedback means are operatively interposed between said actuator means and said output stage means of said valve means.

7. The combination according to claim 1 wherein said negative load pressure feedback means are operatively interposed between said actuator means and said output stage means of said valve means, and said positive load pressure feedback means are operatively interposed between said actuator means and said output stage means of said valve means.

8. The combination according to claim 1 wherein said negative load pressure feedback means are operatively interposed between said actuator means and said output stage means of said valve means, and said positive load pressure feedback means are operatively interposed between said actuator means and said input stage means of said valve means.

9. In a servomechanism, the combination comprising valve means having a plurality of stage means including at least input stage means and output stage fluid flow control means, load actuator means driven by fluid flow controlled by said output stage means, position feedback means operatively interposed between said actuator means and said input stage means, negative load pressure feedback means operatively interposed between said actuator means and one of said stage means, and positive load pressure feedback means operatively interposed between said actuator means and one of said stage means.

10. The combination according to claim 9 wherein said positive load pressure feedback means are low pass frequency sensitive.

11. The combination according to claim 9 wherein said positive load pressure feedback means are operatively interposed between said actuator means and said input stage means of said valve means.

12. The combination according to claim 9 wherein said positive load pressure feedback means are operatively interposed between said actuator means and said output stage means of said valve means.

13. In a servomechanism, the combination comprising fluid-operated actuator means including a movable element, valve means including input stage means and output stage means for controlling fluid flow through at least one of a pair of conduits leading to opposite sides of said element, position feedback means operatively interposed between said actuator means and said input stage means, negative load pressure feedback means operatively interposed between said conduits and said valve means, and low pass frequency sensitive positive pressure feedback means operatively interposed between said load conduits and said valve means.

14. In a servomechanism supported by structure deflectable under static load, the combination comprising fluid-operated actuator means including a movable element, valve means including input stage means and output stage means for controlling fluid flow through at least one of a pair of conduits leading to opposite sides of said element, position feedback means operatively interposed between said actuator means and said input stage means, negative load pressure feedback means operatively interposed between said load conduits and said valve means, and low pass frequency sensitive positive load pressure feedback means operatively interposed between said load conduits and said valve means, the positive load pressure feedback effect being greater than the negative load pressure feedback effect under static load conditions to compensate for deflection of said structure, conditions to compensate for deflection of said structure, thereby to achieve static load error washout.

15. In a servomechanism, the combination comprising valve means for controlling fluid flow through at least one of a pair of conduits adapted to be connected to a fluid-operated load, first feedback means operatively interposed between said load conduits and said valve means and arranged to provide negative load pressure feedback, and second feedback means including fluid restrictor means and fluid accumulator means arranged to provide a low pass frequency sensitive network operatively interposed between said load conduits and said valve means for producing positive load pressure feedback, said network having a corner frequency, each of said restrictor means and said accumulator means having an effective area related one to the other such that said corner frequency is below load resonance.

16. The combination according to claim 15 wherein the positive load pressure feedback effect is greater than the negative load pressure feedback effect below said corner frequency.

17. In a servomechanism, the combination comprising valve means including input stage means and output stage means for controlling fluid flow through at least one of a pair of conduits adapted to be connected to a fluid-operated load, proportional negative load pressure feedback means including a spring-centered piston having first end areas severally in fluid conducting communication with said load conduits and also having second end areas, low pass frequency sensitive positive load pressure feedback means operatively interposed between said load conduits and said second end areas, and force feedback means operatively interposed between said piston and said input stage means.

18. In a servomechanism, the combination comprising valve means including input stage fluid amplifier means and output stage means for controlling fluid flow through at least one of a pair of conduits adapted to be connected to a fluid-operated load, said amplifier means including a movable member, proportional negative load pressure feedback means including a spring-centered summing piston having first end areas severally in fluid conducting communication with said load conduits and also having second end areas, low pass frequency sensitive positive load pressure feedback means including a spring-centered accumulator piston having end areas severally in fluid conducting communication with said second end areas, first and second feedback conduit means establishing fluid conducting communication severally between said accumulator piston end areas and said load conduits and fluid restrictor means arranged in each of said first and second feedback conduit means, and force feedback means operatively interposed between said summing piston and said member.

19. In a servomechanism supported by structure deflectable under static load, the combination comprising fluid-operated actuator means including a movable element, valve means including input stage means and output stage means for controlling fluid flow through at least one of a pair of conduits leading to opposite sides of said element, position feedback means operatively interposed between said actuator means and said input stage means, proportional negative load pressure feedback means including a spring-centered summing piston having first end areas severally in fluid conducting communication with said load conduits and also having second end areas, low pass frequency sensitive positive load pressure feedback means operatively interposed between said load conduits and said second areas, and force feedback means operatively interposed between said piston and said input stage means, said second end areas being larger than said first end areas to compensate for deflection of said structure, thereby to achieve static load error washout.

20. In a servomechanism, the combination comprising a load actuation member, valve means including input stage fluid amplifier means and output stage means for controlling fluid flow through at least one of a pair of conduits adapted to be connected to said load actuation member, said amplifier means including a movable pressure regulating member, said output stage means including a movable valve member, load pressure feedback means including a piston operatively associated with said load conduits, force feedback means operatively interposed between said piston and said pressure regulating member, and force feedback means operatively interposed between said valve member and said pressure regulating member.

21. In a servomechanism, the combination comprising valve means including input stage fluid amplifier means and output stage means for controlling fluid flow through at least one of a pair of conduits adapted to be connected to a fluid-operated load, said amplifier means including a movable pressure regulating member, said output stage means including a movable valve member, load pressure feedback means including a piston operatively associated with said load conduits, a first feedback spring member at one end cantilever-mounted on said pressure regulating member and having its other end constrained to move with said piston, and a second feedback spring member at one end cantilever-mounted on said pressure regulating member adjacent said first feedback spring member and having its other end constrained to move with said valve member.

22. In a servomechanism, the combination comprising valve means including input stage fluid amplifier means and output stage means for controlling fluid flow through at least one of a pair of conduits adapted to be connected to a fluid-operated load, said amplifier means including a flapper movable with respect to nozzles, said output stage means including a movable valve member, load pressure feedback means including a piston operatively associated with said load conduits, a first feedback spring member at one end cantilever-mounted on an end of said flapper, the other end of said first feedback spring member being constrained to move with said piston, and a second feedback spring member at one end cantilever-mounted on said end of said flapper, the other end of said second feedback spring member being constrained to move with said valve member.

23. In a servomechanism, the combination comprising valve means including input stage fluid amplifier means and output stage means for controlling fluid flow through at least one of a pair of conduits adapted to be connected to a fluid-operated load, said output stage means including a movable valve member having drive end faces, said amplifier means including a pair of nozzles severally in fluid conducting communication with said faces and also including a flapper operatively associated with said nozzles, a first feedback spring member operatively interposed between said valve member and said flapper, proportional negative load pressure feedback means including a spring-centered summing piston having first end areas severally in fluid conducting communication with said load conduits and also having second end areas, low pass frequency sensitive positive load pressure feedback means including a spring-centered accumulator piston having end areas severally in fluid conducting communication with said second end areas, first and second feedback conduit means establishing fluid conducting communication severally between said accumulator piston end areas and said load conduits and fluid restrictor means arranged in each of said first and second feedback conduit means, and a second feedback spring member operatively interposed between said summing piston and said flapper.

24. In a servomechanism, the combination comprising valve means including input stage fluid amplifier means and output stage means for controlling fluid flow through at least one of a pair of conduits adapted to be connected to a fluid-operated load, said output stage means including a spring-centered movable valve member having first, second and third pairs of end areas, said amplifier means being arranged to apply a pressure differential on said first end areas in response to a command input signal, negative load pressure feedback means operatively interposed between said load conduits and said second end areas, and low pass frequency sensitive positive load pressure feedback means operatively interposed between said load conduits and said third end areas, whereby the negative and positive load pressure feedback effects are summed on said valve member.

25. In a servomechanism, the combination comprising valve means including input stage fluid amplifier means and output stage means for controlling fluid flow through at least one of a pair of conduits adapted to be connected to a fluid-operated load, said output stage means including a spring-centered movable valve member having first, second and third pairs of end areas, said amplifier means being arranged to apply a pressure differential on said first end areas in response to a command input signal, first feedback conduit means operatively interposed in fluid conducting communication between one of said second end areas and one of said load conduits, second feedback conduit means operatively interposed in fluid conducting communication between the other of said second end areas and the other of said load conduits, said first and second feedback conduit means being arranged to provide proportional negative load pressure feedback on said valve member, and positive load pressure feedback means including fluid accumulator means operatively interposed in fluid conducting communication between said third end areas, first fluid restrictor means operatively interposed in fluid conducting communication between one of said third end areas and one of said load conduits and second fluid restrictor means operatively interposed in fluid conducting communication between the other of said third end areas and the other of said load conduits, whereby said accumulator means and said restrictor means provide a low pass frequency sensitive network.

26. In a servomechanism supported by structure deflectable under static load, the combination comprising fluid-operated actuator means including a movable element, valve means including input stage fluid amplifier means, and output stage means for controlling fluid flow through at least one of a pair of conduits leading to opposite sides of said element, position feedback means operatively interposed between said actuator means and said amplifier means, said output stage including a spring-centered movable valve member having first, second and third pairs of end areas, said amplifier means being arranged to apply a pressure differential on said first end areas in response to a command input signal, proportional negative load pressure feedback means operatively interposed between said load conduits and said second areas, and low pass frequency sensitive positive load pressure feedback means operatively interposed between said load conduits and said third end areas, said third end areas being larger than said second end areas to compensate for deflection of said structure, thereby to achieve static load error washout.

27. In a servomechanism, the combination comprising valve means having a plurality of stage means including at least input stage means and output stage fluid flow control means, load actuator means driven by fluid flow controlled by said output stage means, position feedback means operatively interposed between said actuator means and said input stage means to provide a position servo loop, negative load pressure feedback means, positive load pressure feedback means, one of said pressure feedback means being operatively interposed between said actuator means and said input stage means indirectly through said loop and the other of said pressure feedback means being operatively interposed between said actuator means and one of said stage means outside said loop.

28. In a servomechanism, the combination comprising valve means having a plurality of stage means including at least input stage means and output stage fluid flow control means, load actuator means driven by fluid flow controlled by said output stage means, position feedback means operatively interposed between said actuator means and said input stage means, negative load pressure feedback means, positive load pressure feedback means, one of said pressure feedback means being operatively interposed between said actuator means and said position feedback means and the other of said pressure feedback means being operatively interposed between said actuator means and one of said stage means.

29. The combination according to claim 28 wherein said positive load pressure feedback means are low pass frequency sensitive.

30. In a servomechanism, the combination comprising fluid-operated actuator means including a movable element, valve means responsive to a command input signal for controlling the flow of fluid with respect to at least one of the opposite sides of said element, position feedback means for said actuator means and arranged to produce a position feedback signal which is of opposite polarity to said command signal and summable therewith, and means for changing the effective position feedback signal in response to pressure on said element as a result of load reaction.

31. In a servomechanism, the combination comprising fluid-operated actuator means including a movable element, valve means responsive to a command input signal for controlling the flow of fluid with respect to at least one of the opposite sides of said element, position feedback means for said actuator means and arranged to produce a position feedback signal which is of opposite polarity to said command signal and summable therewith, said position feedback means including a movable member, and means for moving said member relative to said element in response to pressure on said element as a result of load reaction so as to change the effective position feedback signal accordingly.

32. In a servomechanism, the combination comprising actuator means including an actuator piston member having an internal compartment, valve means responsive to a command input signal for controlling the flow of fluid with respect to at least one of the opposite sides of said actuator piston member, position feedback means for said actuator means and arranged to produce a position feedback signal which is of opposite polarity to said command signal and summable therewith, said position feedback means including a movable feedback member, and means for moving said feedback member relative to said actuator piston member in response to pressure on said actuator piston member as a result of load reaction, such last mentioned means including a spring-centered plunger slidably arranged in said compartment to provide chambers on opposite sides of said plunger and passageway means severally leading from said chambers to the end faces of said actuator piston member, such relative movement between said members being operative to change the effective position feedback signal.

33. In a servomechanism, the combination comprising actuator means including an actuator piston member having an internal compartment, valve means responsive to a command input signal for controlling the flow of fluid with respect to at least one of the opposite sides of said actuator piston member, position feedback means for said actuator means and arranged to produce a position feedback signal which is of opposite polarity to said command signal and summable therewith, said position feedback means including a movable feedback member, and means providing a low pass frequency sensitive network for moving said feedback member relative to said actuator piston member in response to pressure on said actuator piston member as a result of load reaction, such last mentioned means including a spring-centered accumulator piston slidably arranged in said compartment to provide chambers on opposite sides of said accumulator piston, passageway means severally leading from said chambers to the end faces of said actuator piston member and fluid restrictor means arranged in each of said passageway means, such relative movement between said members being operative to decrease the effective position feedback signal.

34. In a servomechanism supported by structure deflectable under static load, the combination comprising actuator means including an actuator piston member having an internal compartment, valve means responsive to a command input signal for controlling the flow of fluid with respect to at least one of the opposite sides of said actuator piston member, position feedback means for said actuator means and arranged to produce a position feedback signal which is negative with respect to said command signal and summable therewith, said position feedback means including a movable feedback member, negative load pressure feedback means operatively interposed between said actuator means and said valve means, and means providing a low pass frequency sensitive network for moving said feedback member relative to said actuator piston member in response to pressure on said actuator piston member as a result of load reaction, said last mentioned means including a spring-centered accumulator piston slidably arranged in said compartment to provide chambers at opposite sides of said accumulator piston, passageway means severally leading from said chambers to the opposite end faces of said actuator piston member and fluid restrictor means arranged in each of said passageway means, such relative movement between said members being operative to decrease the effective position feedback signal, the amount of said decrease being sufficient to compensate for deflection of said structure under static load conditions, thereby to achieve static load error washout.

35. In a servomechanism, the combination comprising fluid-operated actuator means including a movable member, means providing a pair of load conduits in fluid conducting communication with opposite sides of said member, valve means including input stage fluid amplifier means and output stage means for controlling fluid flow through at least one of said load conduits, said output stage means including a spring-centered movable valve member having first and second pairs of end areas, said amplifier means being arranged to apply a pressure differential on said first end areas in response to a command input signal, negative load pressure feedback means operatively interposed between said load conduits and said second end areas, position feedback means for said actuator means and arranged to produce a position feedback signal which is of opposite polarity to said command signal and summable therewith, and means providing a low pass frequency sensitive network for decreasing the effective position feedback signal in response to pressure on said member as a result of load reaction.

36. In a servomechanism, the combination comprising fluid-operated actuator means including a movable member, means providing a pair of load conduits in fluid conducting communication with opposite sides of said member, valve means including input stage fluid amplifier means and output stage means for controlling fluid flow through at least one of said load conduits, said output stage means including a spring-centered movable valve member having first and second pairs of end areas, said amplifier means being arranged to apply a pressure differential on said first end areas in response to a command input signal, first feedback conduit means operatively interposed in fluid conducting communication between one of said second areas and one of said load conduits, second feedback conduit means operatively interposed in fluid conducting communication between the other of said second end areas and the other of said load conduits, said first and second feedback conduit means being arranged to provide proportional negative load pressure feedback on said valve member, position feedback means for said actuator means and arranged to produce a position feedback signal which is negative with respect to said command signal and summable therewith, and low pass frequency sensitive means for decreasing the effective position feedback signal in response to pressure on said member as a result of load reaction and including a spring-centered accumulator piston carried by said member and having end faces, third and fourth feedback conduit means arranged in said member and establishing conducting communication severally between its said opposite sides and said end faces and fluid restrictor means arranged in each of said third and fourth conduit means.

37. In a servomechanism, the combination comprising three stage valve means for controlling fluid flow through at least one of a pair of load conduits adapted to be connected to a fluid-operated load, said valve means including input, intermediate and output stage means, said intermediate stage means including a spring-centered second stage valve member having first and second pairs of end areas, said input stage means including fluid amplifier means arranged to apply a pressure differential on said first end areas in response to a command input signal and having a movable pressure regulating member, said output stage means including a third stage valve member which controls the flow of fluid through said load conduits and having drive faces at its opposite ends, said second stage valve member controlling the flow of fluid with respect to said drive faces, negative load pressure feedback means operatively interposed in fluid conducting communication between said second end areas and said load conduits, and force feedback means operatively interposed between said third stage valve member and said pressure regulating member.

38. In a servomechanism, the combination comprising fluid-operated actuator means including a movable member, means providing a pair of load conduits in fluid conducting communication with opposite sides of said member, three stage valve means for controlling fluid flow through at least one of said load conduits, said valve means including input, intermediate and output stage means, said intermediate stage means including a spring-centered second stage valve member having first and second pairs of end areas, said input stage means including fluid amplifier means arranged to apply a pressure differential on said first end areas in response to a command input signal and having a movable pressure regulating member, said output stage means including a third stage valve member which controls the flow of fluid through said load conduits and having drive faces at its opposite ends, said second stage valve member controlling the flow of fluid with respect to said drive faces, force feedback means operatively interposed between said third stage valve member and said pressure regulating member, first feedback conduit means operatively interposed in fluid conducting communication between one of said second end areas and one of said load conduits, second feedback conduit means operatively interposed in fluid conducting communication between the other of said second end areas and the other of said load conduits, said first and second feedback conduit means being arranged to provide proportional negative load pressure feedback on said second stage valve member, position feedback means for said actuator means and arranged to produce a position feedback signal which is of opposite polarity to said command signal and summable therewith, and means providing a low pass frequency sensitive network for decreasing the effective position feedback signal in response to pressure on said member as a result of load reaction.

39. In a servomechanism, the combination comprising fluid-operated actuator means including a movable member, means providing a pair of load conduits in fluid conducting communication with opposite sides of said member, three stage valve means for controlling fluid flow through at least one of said load conduits, said valve means including input, intermediate and output stage means, said intermediate stage means including a spring-centered second stage valve member having first and second pairs of end areas, said input stage means including fluid amplifier means arranged to apply a pressure differential on said first end areas in response to a command input signal and having a movable pressure regulating member, said output stage means including a third stage valve member which controls the flow of fluid through said load conduits and having drive faces at its opposite ends, said second stage valve member controlling the flow of fluid duit means operatively interposed in fluid conducting communication between the other of said second end areas and the other of said load conduits, said first and second feedback conduit means being arranged to provide proportional negative load pressure feedback on said second stage valve member, position feedback means for said actuator means and arranged to produce a position feedback signal which is of opposite polarity to said command signal and summable therewith, and low pass frequency sensitive means for decreasing the effective position feedback signal in response to pressure on said member as a result of load reaction and including a spring-centered accumulator piston carried by said member and having end faces, third and fourth feedback conduit means arranged in said member and establishing fluid conducting communication severally between its said opposite sides and said end faces and fluid restrictor means arranged in each of said third and fourth conduit means.

(References on following page)

References Cited

UNITED STATES PATENTS

| | | | |
|---|---|---|---|
| 2,939,472 | 6/1960 | Eller | 137—86 |
| 2,964,059 | 12/1960 | Geyer | 137—625.62 |
| 2,995,116 | 8/1961 | Dobbins | 137—86 |
| 3,009,447 | 11/1961 | Lloyd | 91—388 |
| 3,023,782 | 3/1962 | Chaves et al. | 137—85 |
| 3,054,388 | 9/1962 | Blanton | 91—388 |
| 3,095,906 | 7/1963 | Kolm | 137—625.62 |
| 3,171,329 | 3/1965 | Rasmussen | 91—388 |

FOREIGN PATENTS

| | | |
|---|---|---|
| 672,800 | 10/1963 | Canada. |

PAUL E. MASLOUSKY, Primary Examiner

U.S. Cl. X.R.

91—173, 363, 365; 137—625.62

PO-1050
(5/69)

UNITED STATES PATENT OFFICE

CERTIFICATE OF CORRECTION

Patent No. 3,464,318 Dated September 2, 1969

Inventor(s) William J. Thayer and Kenneth D. Garnjost

It is certified that error appears in the above-identified patent and that said Letters Patent are hereby corrected as shown below:

Column 10, line 30, change "and" to --or--.

Column 16, line 68, change "ot" to --to--.

Column 18, line 24, delete "load"; and line 41, delete "conditions to compensate for deflection of said structure,".

Column 23, line 52, after "establishing" insert --fluid--.

Column 24, line 55, after "fluid" insert --with respect to said drive faces, force feedback means operatively interposed between said third stage valve member and said pressure regulating member, first feedback conduit means operatively interposed in fluid conducting communication between one of said second end areas and one of said load conduits, second feedback con- --.

SIGNED AND SEALED
MAY 12 1970

(SEAL)
Attest:

Edward M. Fletcher, Jr.
Attesting Officer

WILLIAM E. SCHUYLER, JR.
Commissioner of Patents